(12) United States Patent
Rauch et al.

(10) Patent No.: US 6,272,489 B1
(45) Date of Patent: Aug. 7, 2001

(54) VISUALLY ORIENTED, EASILY NAVIGABLE SEARCH FACILITY

(75) Inventors: Thyra L. Rauch, Raleigh; Sarah D. Redpath, Cary; John L. Scanlon, Raleigh; David A. Schell, Durham, all of NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/076,308

(22) Filed: May 12, 1998

(51) Int. Cl.[7] .................................................. G06F 17/30
(52) U.S. Cl. .................................................. 707/4; 345/326
(58) Field of Search ................. 707/3–5; 345/336–338, 345/326

(56) References Cited

U.S. PATENT DOCUMENTS 5,428,735 * 6/1995 Kahl et al. ............................ 345/349
5,813,014 * 9/1998 Gustman ............................... 707/103
5,911,138 * 6/1999 Li et al. .................................... 707/3

* cited by examiner

Primary Examiner—Paul V. Kulik
(74) Attorney, Agent, or Firm—A. Bruce Clay; Marcia L. Doubet

(57) ABSTRACT

A technique, system, and computer program for providing a visually oriented, easily navigable search facility. Templates containing field names and possible default values are stored for each available task for this user, preferably in a memory cache or disk cache. When the user enters a value or pattern into a field of the search criteria, this value or pattern is retained. When a subsequent search is requested, the retained values are checked to determine if the user already entered values for any fields of the now-current template. If so, then those values are automatically filled in for this current template. The user is allowed to override any of the filled-in values, and these overrides will also become retained values. Retained values are cleared when the user exits the search facility, or when the user explicitly requests to clear the values.

24 Claims, 8 Drawing Sheets

VISUALLY ORIENTED, EASILY NAVIGABLE SEARCH FACILITY

RELATED INVENTION

IBM application Ser. No. 09/076,307 entitled "Systems, Methods and Computer Program Products for Retrieving Documents from Multiple Document Servers via a Single Client Session", filed May 12, 1998, now U.S. Pat. No. 6,141,659.

BACKGROUND OF THE INVENTION

FIELD OF THE INVENTION

The present invention relates to data retrieval, and deals more particularly with a method and apparatus for increasing usability of search facilities by retaining user-entered search criteria between searches. This retained information can be displayed in the visual search facility for subsequent searches, and can be re-used in those searches—regardless of any rearrangement of the data, change in field names or format, etc.

DESCRIPTION OF THE RELATED ART

Data processing and database access systems commonly provide search facilities with which a user can access and retrieve data. Typically, the user enters parameters to be used as search criteria into fields through a graphical user interface, where each parameter comprises a data descriptor (such as a field name) and a data value or pattern. The search facility then uses those parameters to create a Boolean expression, and that expression is used to find data that matches the specified criteria. A "pattern" in this context means any type of wildcard mechanism for representing a value. A typical example is use of the "*" character, to signify that any character (or possibly more than one character) appearing in the data will be considered a successful match for this criteria.

In modern search facilities, the user is not required to know, or to specify, detailed information about the underlying data (such as where the data is stored, the names and types of the fields, etc.). Instead, the search facility provides the user with a high-level interface for specifying the data values or patterns, and automatically aligns what the user has entered to the appropriate data storage. For example, the user may enter an account number (a data value) into a first search field, and some type of wild card (a search pattern) into a second search field. The search facility automatically handles any alignment of the account number that may be required before comparing the user's entry to the stored account numbers being searched, and also automatically performs any conversion required to compare the wild card to the appropriate field(s). However, these search facilities do not model the information in a way that is easy for the search user to process. The information presented tends to omit any user-specific structure and information, resulting in a cumbersome, tedious approach to the searching task.

Further, as a user performs various functions in the data processing system or database access system, he often will encounter a particular data field multiple times. Today, if the user wishes to reuse a previously-entered value or pattern in that data field for searching purposes, he must usually re-type the same value or pattern he used in the previous location (such as an earlier search window). Alternatively, the user may copy the previously-entered value or patten to the new location using Copy and Paste operations, whereby he first locates the earlier entry, then copies the value or pattern he entered there, returns to the new location, and pastes the copied data into that location. This latter approach, while it avoids the requirement to retype the information, requires a number of steps. For example, just to copy the previously-entered data, the user will typically have to use a pointing device such as a mouse, depress a selection button on the device, drag the device across the data, locate a pull-down menu having a Copy choice, and select that choice. It may take some time for the user to locate the previously-entered data, or to make his way back to the new location to perform the paste operation. The paste operation also requires a number of steps, such as placing the cursor in the desired field, locating a menu having a Paste choice, and selecting that choice. And, when there are multiple values or patterns the user would like to re-use, his task is even more difficult: copying from multiple fields is typically not allowed, so that the user has to perform the copy and paste operations separately for each different field. Both the manual retyping and the copy and paste alternative are inefficient, error prone, and tedious for the user. The time spent on this redundant data entry is time the user could better spend performing the function at hand.

Accordingly, a need exists for a method and system of providing a visually integrated, easily navigable search facility that avoids these problems, resulting in a more intuitive and more efficient approach to searching. The proposed technique retains user-entered information from one search to another, for the duration of the user's current interaction with the data processing or database system. Further, the proposed technique automatically determines when that retained information can be re-used, and presents it to the user without requiring the user to request it.

SUMMARY OF THE INVENTION

An object of the present invention is to provide an improved visual model for entering and displaying search criteria, whereby the model is visually integrated and easily navigable.

Another object of the present invention is to provide a technique whereby the search criteria entered by a user is retained from one search to another.

Still another object of the present invention is to provide a technique whereby any applicable part of the retained search criteria is automatically made available for a subsequent search having common search criteria fields.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for providing a visually oriented, easily navigable search facility. A visual model is displayed. A user of this search facility can enter search criteria into one or more fields of a search template (from a plurality of such search templates), using the visual model. These search criteria comprise zero or more data values, and zero or more data patterns. The entered criteria are used for searching, and are retained between searches. The retained criteria are copied into a subsequently-displayed search template if any of the fields matches that subsequent template. Further, default criteria may exist for any of the fields, where the default criteria comprises zero or more default data values and zero or more default data patterns. Each of these default criterion is displayed in the appropriate field, and the user may choose to replace one or more of the default criteria by entering different data. The search then further comprises using any default criteria that are not replaced. Preferably, the search further comprises using the copied criteria. Additionally, the facility may enable the user to override one or more of the copied criteria and retain the overridden criteria, and the search will further comprise using the overridden criteria. Optionally, the facility may enable the user to choose whether the overridden criteria are treated as local overrides or as global overrides, and/or may enable the user to clear the retained values. Prioritization may be done for a given search criterion which has either a default value or default pattern, and also a retained data value or a retained data pattern. Optionally, the visual model is initially displayed with a first search template from the plurality of search templates, wherein the first search template was accessed last by the user in a prior invocation of the search facility.

The present invention will now be described with reference to the following drawings, in which like reference numbers denote the same element throughout.

DESCRIPTION OF THE PREFERRED EMBODIMENT

Figure 1:
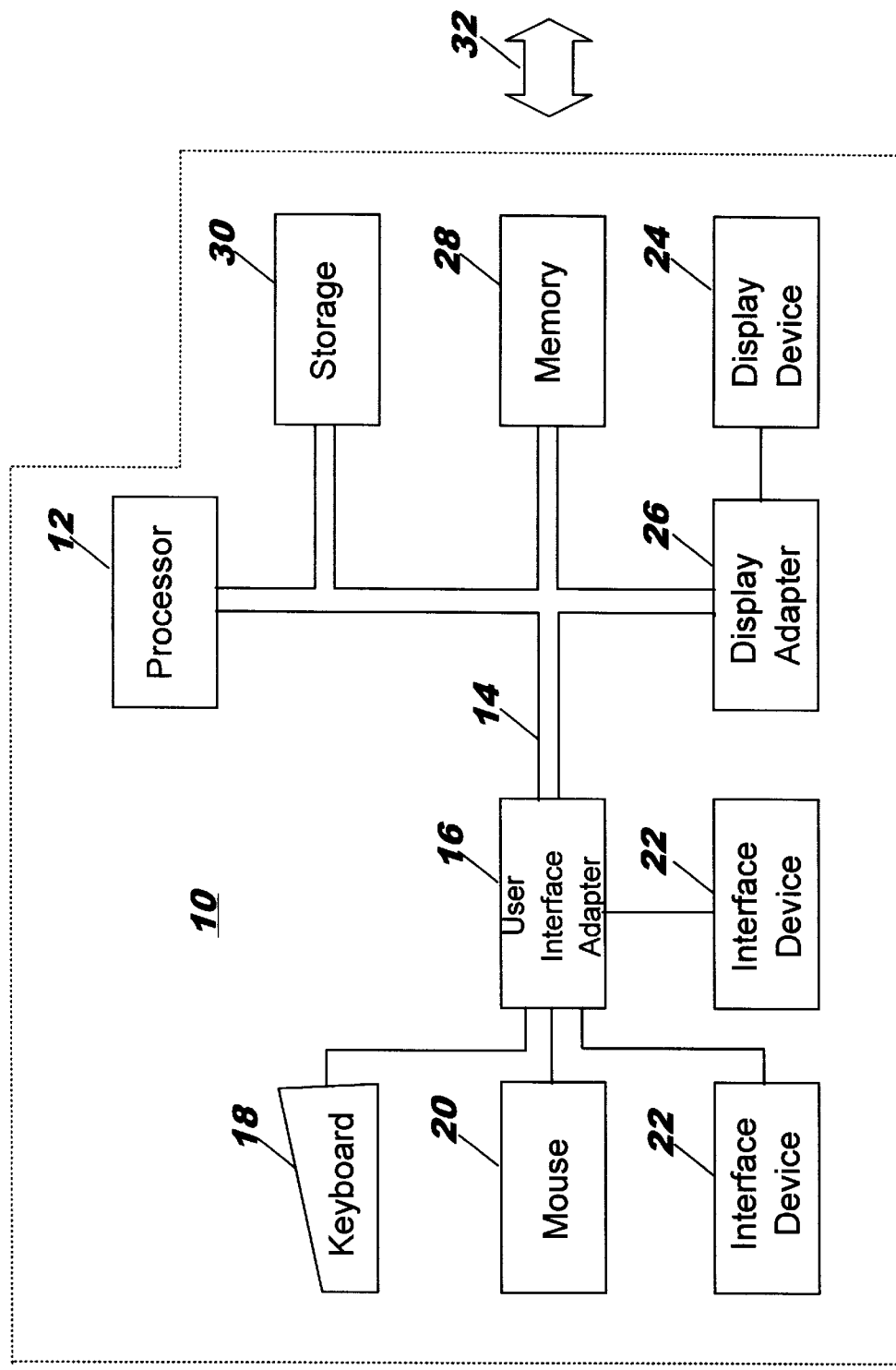
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), the workstation 10 can be a client in a client/server arrangement with another computer, it may be a standalone computer not connected in a network, etc. All of these configurations, as well as the appropriate communications hardware and software, are known in the art.

Figure 2:
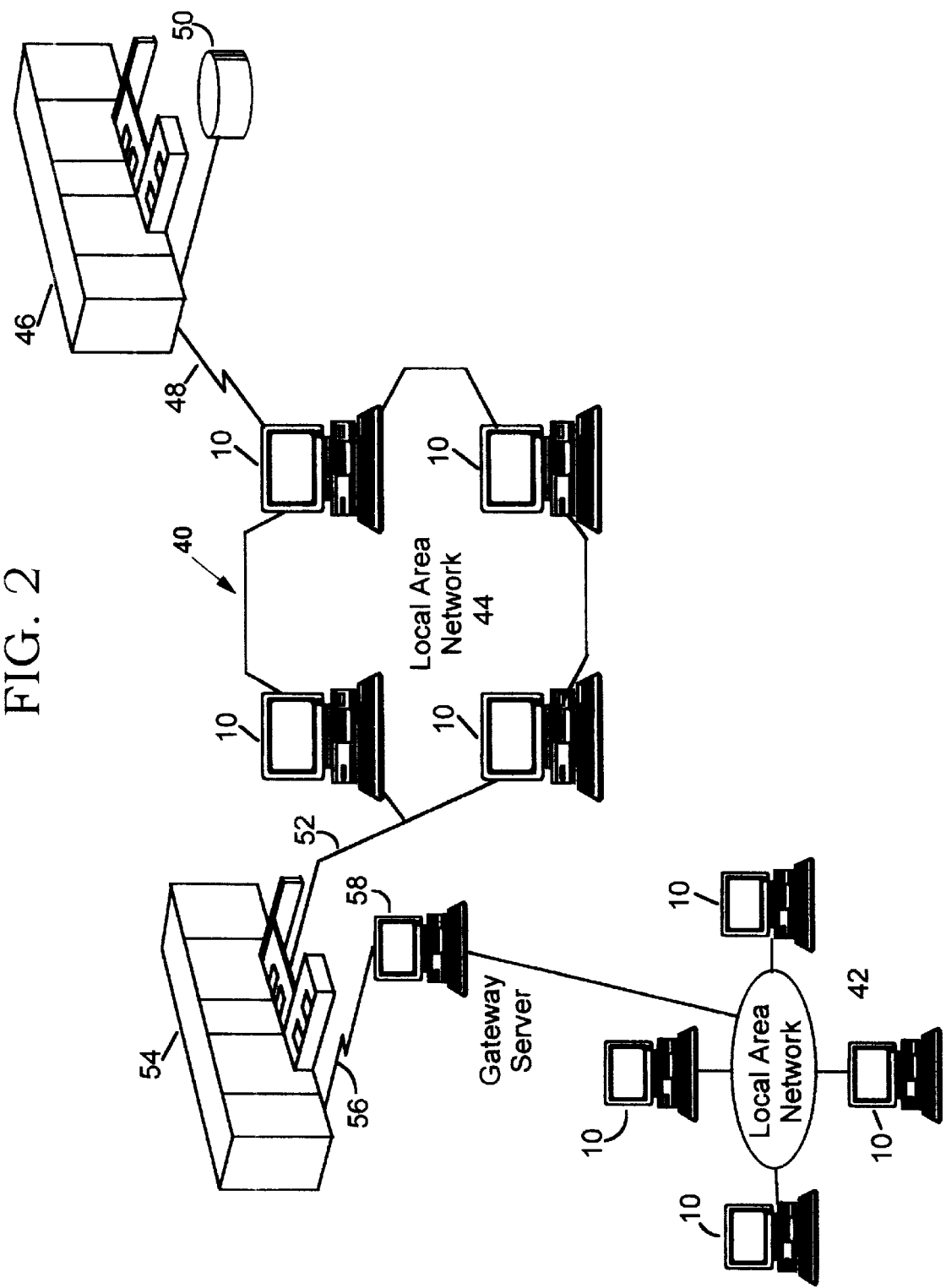
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The visual model embodying the search criteria display and entry facility resulting from use of the present invention may be displayed on any of the various display devices 24, and accessed using any type of interface device such as a keyboard 18, mouse 20, and/or other interface devices 22 (including any user interface device, such as a touch sensitive screen, digitized entry pad, etc.).

The data processing system or database access system with which the present invention is used may operate in a number of environments. The program code implementing the present invention, as well as the data repository to be searched, may reside locally on one or more computers that are within a short distance of each other.

Alternatively, the program code, the data repository, or both may reside on one or more computers at a remote location, and be accessed through a network such as that shown in FIG. 2. The program may be used in an Internet environment, where the server 46 is a Web server and the search request and results are sent using a protocol such as HTTP (or HTTPS). The Internet is a vast collection of computing resources, interconnected as a network, from sites around the world. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users. (Alternatively, the connection may be to a corporate intranet—that is, a network owned or managed internally to the user's company—of which the user's computer is a component, where this corporate intranet provides services in a similar manner to the Internet. Use of the term "Internet" herein, when discussing processing associated with the user's request, includes processing that occurs in an intranet, unless otherwise stated.)

The user working in a Web environment will have software running on his computer to allow him to create and send requests for information, such as the search requests of the present invention, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents databases of information that may be accessed by the Web server as part of the task of processing the client's request.

The preferred embodiment of the present invention will now be discussed with reference to FIGS. 3 through 5. In the preferred embodiment, the present invention is implemented as a computer software program. The program code of the preferred embodiment may be implemented as objects in an object-oriented programming language such as Smalltalk, or the code may be implemented using any conventional procedural programming language, such as the "C" programming language. The program code may execute entirely on the user's computer, as a stand-alone software package, or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

FIGS. 3A–3D illustrate how a visual model incorporating the invention may be presented to a user. These figures are merely examples of how the search facility may be visually represented, and are not to be interpreted as limiting the invention in any way.

Figure 3A:
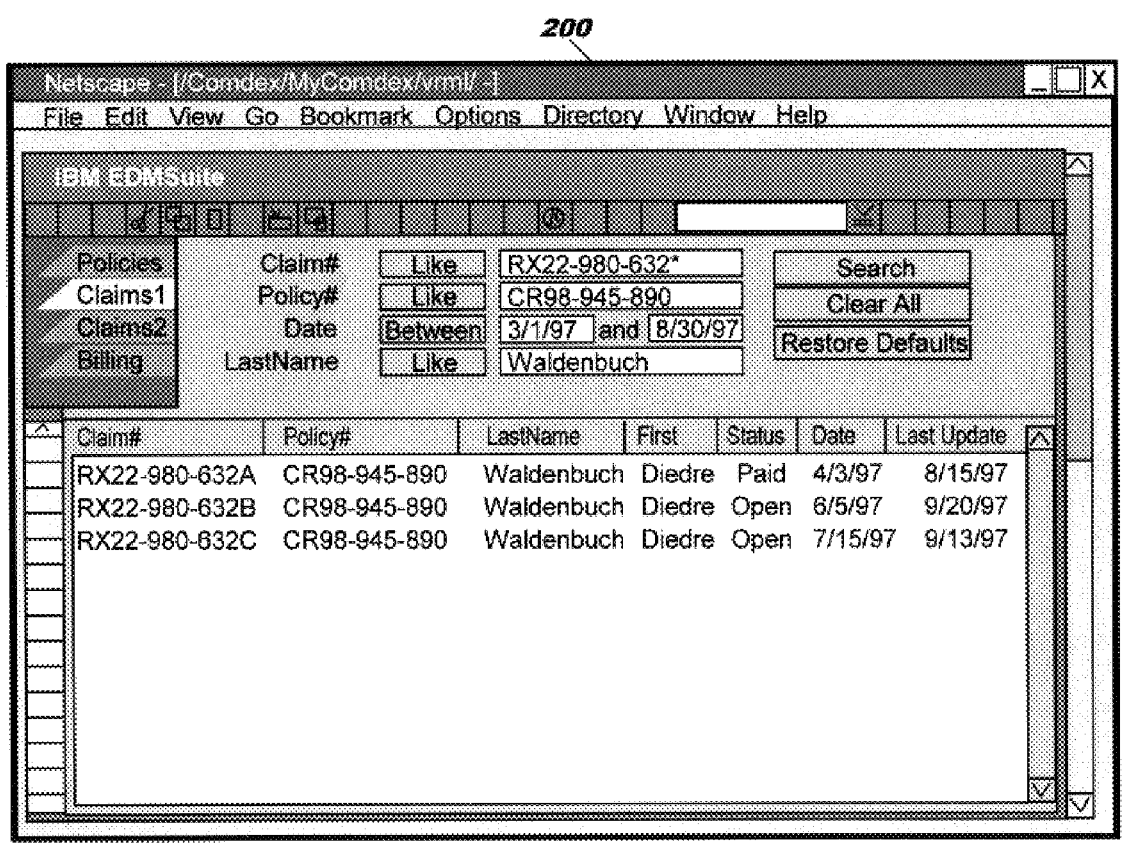
FIG. 3A shows the visual model of the invention in a browser, along with a user interface control which displays available tasks.
Figure 3B:
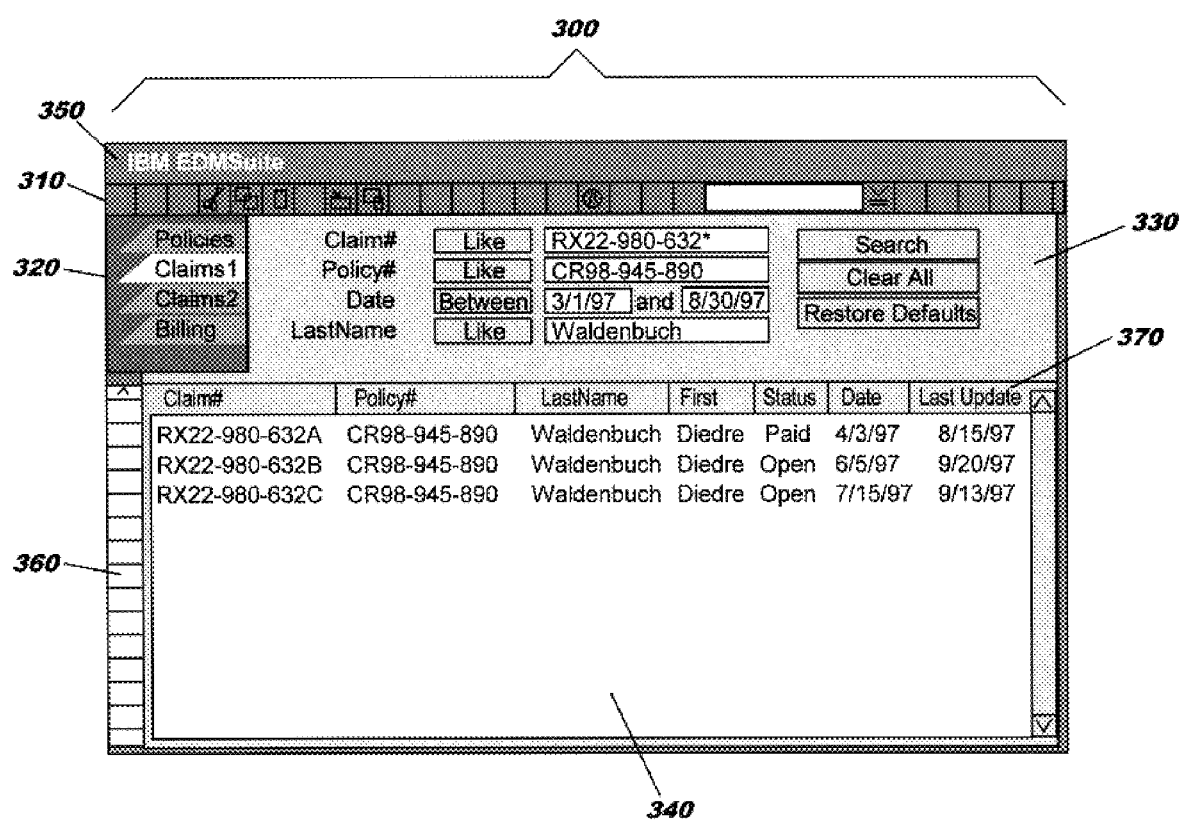
FIG. 3B shows the visual model operating without a browser.
Figure 3C:
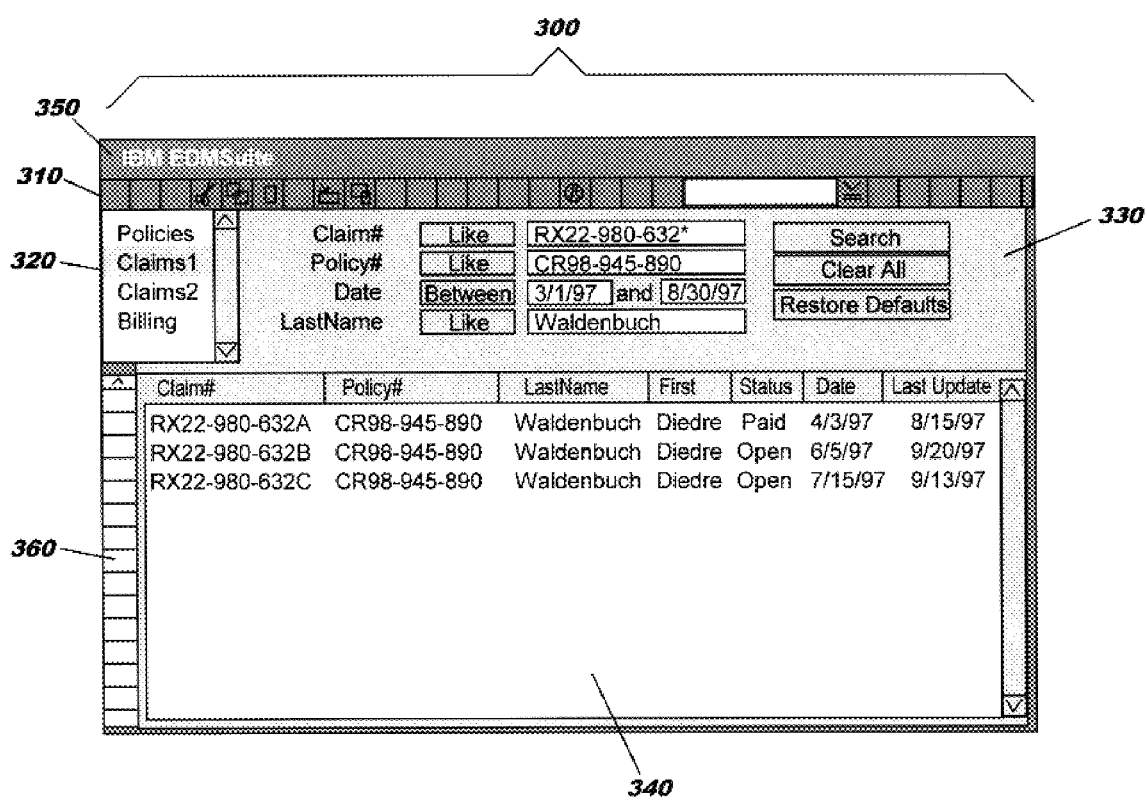
FIG. 3C shows the visual model, with a standard list box used to display available tasks.

FIG. 3A illustrates a visual model incorporating the invention, where the visual model is displayed within a browser 200. This will typically occur when the invention is used in an Internet environment, accessing data stored at one of the remote computers of the Internet. FIG. 3B illustrates the graphical user interface of the visual model 300 in more detail. As shown in this Figure, the visual model 300 includes an optional icon palette 310 (referred to alternatively as a toolbar), a navigational window 320, a panel template window 330 in which search criteria are entered and displayed, a search results area 340, an optional banner 350 that may display the name of the application program or task, an optional and dockable search results toolbar 360, and category headings 370. The navigational window 320 may use the user interface control shown in FIGS. 3A and 3B (referred to hereinafter as a "folder tab list box", or "folder tabs"), a standard list box as shown in FIG. 3C, or any other type of presentation which displays available choices and enables a user to select from those choices. The entries in the navigational window 320 typically represent tasks such as business activities that the user may carry out using the program code in which the present invention is embodied. (Note that the manner in which the task names are entered within navigational window 320 does not form part of the present invention.) While a specific layout of the components 310 through 370 is shown in FIGS. 3B and 3C, this layout is for illustrative purposes only, and is not intended to limit the inventive concepts of the present invention in any way.

Figure 3D:
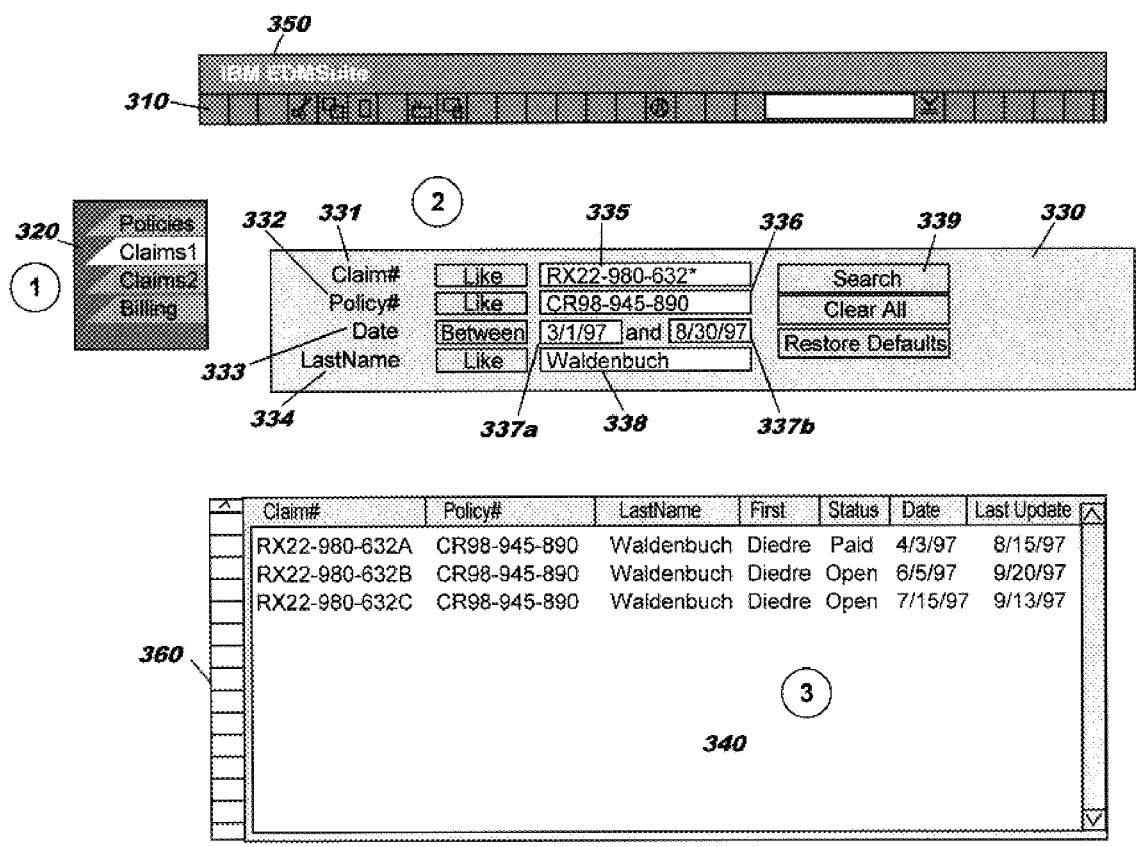
FIG. 3D is a diagram showing the visual model hierarchy, with which the relationships between the components making up the display are illustrated.

The behavior of the components 310 through 370 is intrinsically linked in a hierarchical manner. FIG. 3D illustrates the relationships between these components, with a typical search scenario. First (as indicated by the placement of the encircled numeral 1), the user makes a selection from the choices displayed in navigational window 320. Second (as indicated by the placement of the encircled numeral 2), this selection directs what is displayed in the panel template window 330, as well as the category headings 370 in the search results area 340. For example, when the user selects the "Claims1" choice from the navigational window 320, as shown by highlighting the corresponding folder tab, the panel template window 330 displays fields 331, 332, 333, 334 that are specific to that selection. Third, the information filled into template window 330 controls what is displayed in the search results area 340 (as indicated by the placement of the encircled numeral 3). In the example shown, information is filled into the areas 335, 336, 337a, 337b, 338. These filled-in values (such as 336, 337a, 337b, 338) and patterns (such as 335, which includes the wild-card character "*") become the search criteria for the current search when the user requests a search (for example, by using the search button 339), and are retained for possible use in subsequent searches. Hereinafter, in the context of searching, use of the word "values" should be construed to include search criteria expressed as an actual value, or expressed using a pattern.

Figure 4:
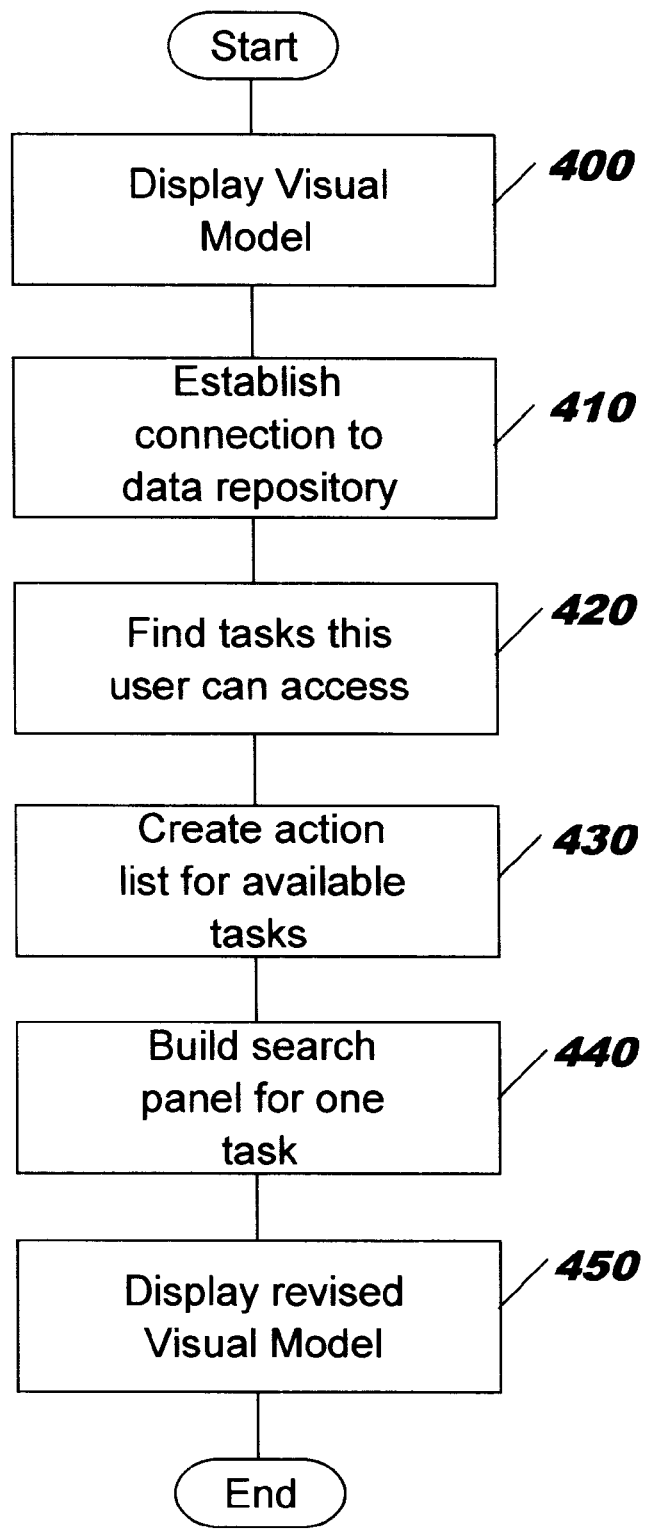
FIG. 4 illustrates a flow chart which sets forth the logic involved with the present invention to present the search facility to the user as part of the visual model in which he performs various tasks.

FIG. 4 illustrates the logical steps performed in a computer software application to present the search facility of the present invention to the user as part of the visual model in which he performs various tasks (such as business activities). Step 400 indicates that the visual model is displayed, in response to the user invoking the program code in which it is embodied. The manner in which the program code is invoked does not form part of the present invention, and may use any number of techniques (such as clicking on an icon representing the program) which are known in the art. The program code may execute as a stand-alone program, running entirely on the user's computer system (in which case the visual model will be displayed as shown in FIG. 3B), or it may execute in a client-server environment such as the Internet, where some part of the program code or the data repository, or both, resides on one or more remote computer systems (in which case the visual model may be displayed in a browser, as shown in FIG. 3A).

At Step 410, the code embodying the visual model establishes a connection to one or more data repositories available for access by this user. If the program runs in stand-alone mode, then this connection establishment comprises locating the repositories, and invoking any data access facilities (such as database engines) that may be required in order to send and receive data between the visual model and the repositories. If the program runs in a client-server mode, then a network connection is required in order to communicate with the server. If a network connection is already running, then the visual model simply makes use of that connection. Otherwise, a network connection is set up. Techniques for establishing and using network connections, as well as connections to data repository access facilities, are well known to one of ordinary skill in the art, and do not form part of the inventive concepts of the present invention. When a network connection is used, data access facilities may need to be invoked by the server at the other end of the connection, so that the server can access the remotely-stored data. These techniques are also known in the art, and do not form part of the present invention.

Step 420 obtains a list of the tasks that this user can access. In the example shown in FIG. 3B, the tasks available to this user are shown as "Policies", "Claims1", "Claims2", and "Billing", indicating that this user can access data related to policies, claims, and billing functions.

At Step 430, an actions list is built from the available tasks list (such as the list shown in navigational window 320).

Step 440 builds a search template for one of the available actions in the tasks list. Typically, this will be the first action from the list, but any other choice may be used without deviating from the inventive concepts of the present invention. In one embodiment, the search template is built for the last task accessed by this user in his most-recent usage of the software in which the invention is embodied. Preferably, the choice that is used will be visually marked in the actions list, so that the user will intuitively know that the search template displayed in panel template window 330 belongs with that action. This visual marking may be by any technique that serves to visually differentiate the selected action, such as changing the color of the folder tab on which the action is presented, as has been done in FIGS. 3A–3D (for the "Claims1" folder tab). A search template may be built at this step so that the panel template window 330 will be filled with an initial search template into which the user can enter search criteria. At Step 450, the visual model 300 is redisplayed, so that the updated areas (navigational window 320 and panel template window 330) are shown with information available for use by this user.

Figure 5:
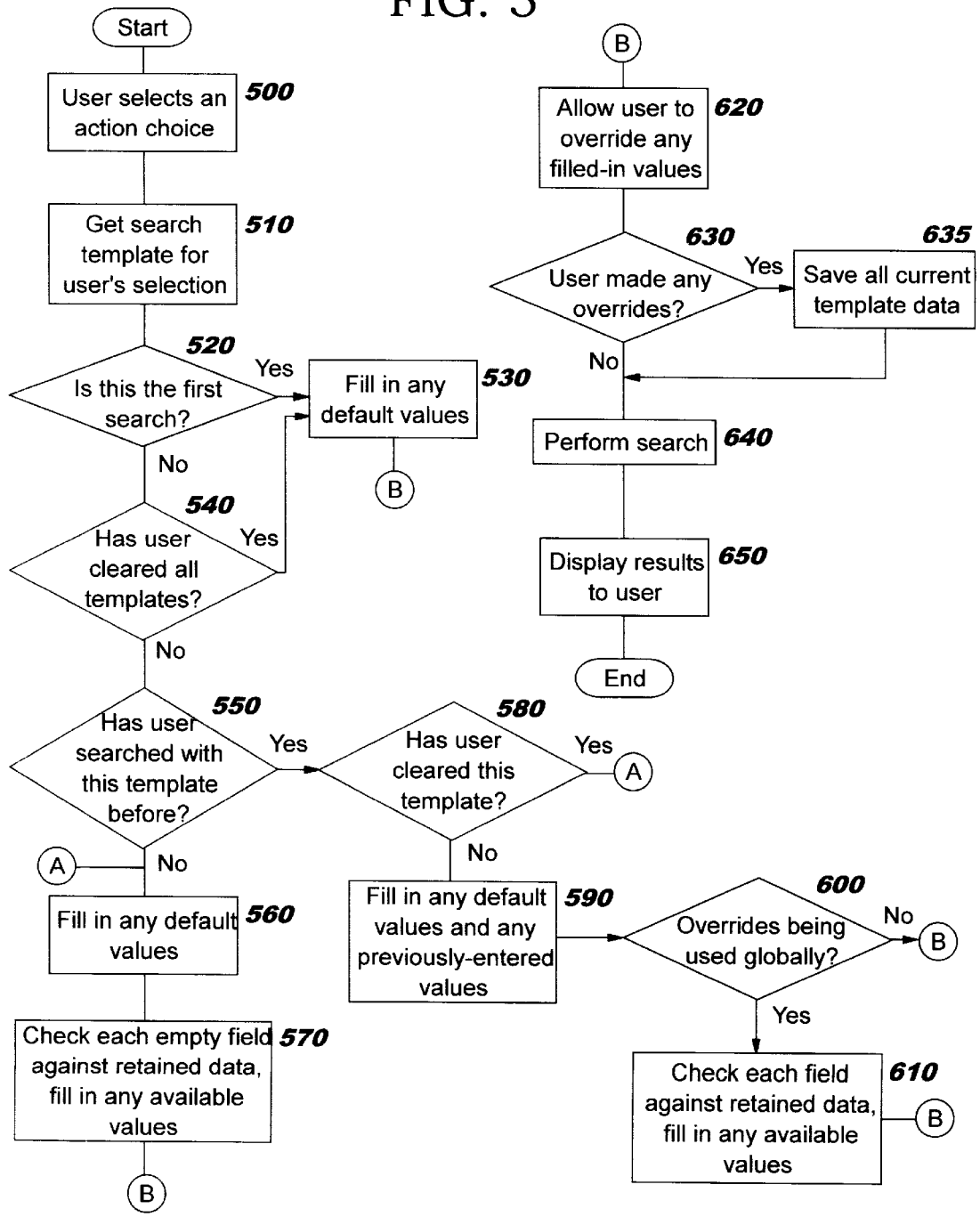
FIG. 5 illustrates a flow chart which sets forth the logic involved with the present invention when the user selects a task that involves using search criteria.

Alternatively, this Step 440 of building a search template can be delayed, until the user has actually selected an action from the list in navigational window 320 (at Step 500 of FIG. 5). If building the template is delayed, then the window 330 will be shown as an uninitialized area of the visual model 300 at Step 450. The revised visual model 300 displayed at Step 450 will have the navigational window 320 updated with the actions list built in Step 430, but preferably no selection from this list will be indicated.

In order to build a search template for use in the present invention, default values may be used for one or more of the fields for any particular search task. The manner in which these default values are created does not form part of the present invention, and can be done in a number of ways that will be obvious to one of ordinary skill in the art. Further, the manner in which the default values are stored does not form part of the present invention. What is required is that some type of association between the field name and its default value is available to the embodiment of the present invention. For example, for a particular search task, a file may be stored on a disk, where that file contains pairs of entries, each entry being a field name and a value. If there is no default for that field, the second element of the pair is indicated in some manner as having no value (using a null value, for example, or some predefined value that indicates nulls). If there is a default, however, then the pair of entries has both the field name and its default value. When the panel template window 330 is displayed, these default values will be shown in their associated fields.

FIG. 5 illustrates the logical steps performed when a user uses the present invention to perform a search. At Step 500, the user makes a selection from the action choices displayed in navigational window 320. This selection may be made using a pointing device such as a mouse, or any other selection technique that indicates a user's choice from displayed alternatives. At Step 510, the search template for this selection is obtained. This search template defines the fields that will be displayed for this task in panel template window 330. Preferably, this information is also used to create the category headings display 370 for the search results window 340.

Steps 520 through 620 complete the process of filling data values or patterns into the search template. At Step 520, a test is made to determine if this is the first search performed by the user during the current invocation of the visual model software. If so, then control transfers to Step 530; otherwise, control transfers to Step 540.

At Step 530, any default values that are defined for the fields of this search template are filled in to the template.

Since this is either the first search conducted during this invocation, or the user has requested to clear all retained values, there are no retained values to be used. Control then transfers to Step 620.

At Step 540, a test is made to determine whether the user has requested to clear all the values stored during this invocation. If this test is positive, then control transfers to Step 530, described above; otherwise, control transfers to Step 550.

Step 550 tests to see if the user has performed any searches using this template during the current invocation. If yes, then control transfers to Step 580; otherwise, control transfers to Step 560.

Step 560 is reached when the user has not performed searches from this template during his current invocation, or has performed at least one search but explicitly requested to clear the values retained for this template. Thus, there are no overridden values stored with this template. If any default values have been stored for this template, they are filled in at Step 560. Next, Step 570 checks to see if there are any retained values, from other searches during the current invocation, that can be used with this template. This is done by comparing each empty field of the template (i.e. those that have no default value) to the set of fields for which values have been retained, to determine if a value or pattern has already been entered by the user for this field. For each field of the current template, this comparison ends when a matching field name and a value or pattern are found, or when all stored templates have been unsuccessfully checked for this field name with a corresponding value or pattern. Each time a matching field is found, its retained value is filled into the corresponding field of this template, to be made available as a search parameter in the upcoming search. When all fields have been checked in this way, Step 570 completes, and control then transfers to Step 620.

At Step 580, a test is made to determine whether the user has requested to clear the values that may have been stored for this particular template. If this test has a positive result, control transfers to Step 560; otherwise, control transfers to Step 590.

At Step 590, any default values that have been defined for this template are filled in. Additionally, any values that the user has explicitly entered (including those that override default values) are filled in. By filling in the user's previously-entered data in this way, it will appear to the user that the search mechanism "remembers" the state of his workspace for each task, and is restoring that state when he returns to the task. Control then transfers to Step 600.

Step 600 indicates an optional feature of a preferred embodiment, whereby processing will be different when a user returns to a task for which he has already conducted a search, depending on whether overrides are being used globally or locally. Using overrides globally, according to the present invention, means that when a user enters a value for a field on one template, and then enters a different value for that same field name on another template, the later-entered value overrides the earlier-entered value—even when the user returns to the earlier template. When overrides are used locally, however, the earlier value will be used when the user returns to the template on which that value was directly entered, and the later value will be used for all other templates that have that field. The decision to store globally or locally is preferably a user option, which may be set when the user configures the software embodying the present invention. Techniques for configuring options are well known in the art. For example, the user may be prompted to enter "Global" or "Local" by checking a box in a window, in response to a question such as "How should overrides be used?". If this optional feature is not implemented in an embodiment of the preferred invention, then the test at Step 600 will not be performed, and the implementation will preferably execute Step 610 immediately following Step 590 (i.e. as if overrides were being used globally).

Step 610 checks to see if there are any retained values, from other searches during the current invocation, that can be used with the fields of this template. Each field of the template is compared to the set of fields for which values have been retained, in the same manner described above for Step 570. Each time a matching field is found, its retained value is filled into the corresponding field of this template, to be made available as a search parameter in the upcoming search. The retained value is used, even though the field may have had a default value or a previously-entered value for this template, because values retained from overrides are being used globally in this path of control. When all fields of the current template have been processed in this manner, control transfers to Step 620.

At Step 620, default values and retained values have been filled into the current search template. Step 620 indicates that the user may choose to override any of these filled-in values, for example by overtyping them with a new value or pattern. Following completion of Step 620, the panel template window 330 contains the complete set of search criteria to be used in carrying out the current search.

Step 630 tests to see if the user made any overrides. If not, then control transfers to Step 640. Otherwise, Step 635 saves the values of all existing fields of the current search template, for example by copying them to a memory or data cache. It will be obvious to one of ordinary skill in the art that many of these values are already stored in the cache for the current template (that is, all except those overridden in Step 620), and that this step is included in FIG. 5 to emphasize the process of retaining the entered data values. It is not actually necessary to store any values in the current template cache that have already been stored there. Further, the saving of any changed data does not necessarily need to occur at this point in the processing: equivalently, the save process could occur following Step 640 or Step 650 without deviating from the inventive concepts of the present invention.

While Steps 530, 560, and 590 are shown as steps for filling in default values in FIG. 5, it will be obvious to one of ordinary skill in the art that their functions may be intermingled or performed at alternative steps of the processing. For example, any default values may already be stored in the applicable fields, upon retrieving the template at Step 510, so that no separate copying is required. Preferably, values for retained data will take precedence over default values, so that when both a default value and a retained value exist for a given field, the retained value will be used as that field's value in the current search template.

In an optional feature of the preferred embodiment, the user is presented with field-specific search operators on panel template window 330, with which he may create more powerful search expressions. Examples are shown in FIGS. 3A–3D using the operators "Like" and "Between". Additional operators may include "equal to", "less than", etc. Use of these operators, and the manner in which the proper operator is determined and made available for a search template, does not form part of the present invention.

Step 640 indicates that the search is performed, using the criteria that have been built up by the processes of Steps 520 through 620. When the data repository is stored remotely, a search request will preferably be formatted and sent into the Internet for processing, and a response will be returned to the user's browser when the search is complete. If the data repository is stored locally, a search request is preferably formatted and sent to an appropriate search processor such as a database engine. The manner in which the search is sent for processing, and in which the search is actually conducted, does not form part of the present invention.

At Step 650, the results of the search are displayed to the user in the search results area 340.

While FIG. 5 shows the search process ending at Step 650, it will be obvious that the logic of FIG. 5 can be repeated as many times as desired by the user, for subsequent searches. The process is re-entered at Step 500 each time the user selects a different action choice from the navigational window 320. The process may alternatively be re-entered at Step 620, by the user making manual overrides to the criteria that are currently displayed in the panel template window 330.

Preferably, the preferred embodiment includes a "Clear" function, with which the user can clear out the values stored in the memory or disk cache. This Clear function may be invoked by pressing the button 339 of the panel template window 330. Alternatively, a function key may be defined to represent invocation of this function, or Clear may be presented as a choice from a pull-down menu, etc. If the user does not explicitly request to clear the retained values during execution, or if this feature is not made available to the user, the values will be cleared when the user exits the program code in which the visual model is implemented. Optionally, two levels of this Clear function may be made available to the user: one to clear only entries of the current template, and another to clear all entries of the current invocation. The two levels of this approach have been illustrated in FIG. 5 (at Steps 540 and 580).

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment, computer readable code for providing a visually oriented, easily navigable search facility, said computer readable code comprising:

a subprocess for displaying a visual model for using said search facility;

a subprocess for accessing a plurality of search templates, each of said search templates comprising a collection of one or more search fields;

a subprocess for enabling a user of said search facility to enter search criteria into said collection of search fields of a selected one of said search templates which is accessed and displayed using said visual model, wherein said entered search criteria comprise at least one of (1) one or more data values and (2) one or more data patterns;

a subprocess for retaining said entered search criteria pertaining to said collection of search fields;

a subprocess for performing a first search using said entered search criteria; and a subprocess for automatically copying one or more of said retained search criteria into selected search fields of a second subsequently-accessed and subsequently-displayed one of said search templates, wherein said selected search fields are those which are also present in said collection of search fields for which said search criteria were retained, even though said second search template may have a different collection of search fields than said selected search template and said selected search fields may be differently arranged on said second search template than on said selected search template, thereby pre-filling said second search template for performing a second search.

2. The computer readable code according to claim 1, wherein default criteria may exist for any of said one or more search fields, wherein said default criteria comprises at least one of (1) one or more default data values and (2) one or more default data patterns and further comprising:

a subprocess for displaying each of said default criterion in said one or more search fields for which it exists;

wherein said subprocess for enabling said user to enter search criteria further comprises enabling said entered search criteria to replace one or more of said default criteria; and wherein said subprocess for performing a first search further comprises using said default criteria that are not replaced along with said entered search criteria.

3. The computer readable code according to claim 1, further comprising:

a subprocess for enabling said user to enter additional search criteria into those search fields of said second search template which are not present in said collection of search fields for which said search criteria were retained; and a subprocess for performing said second search using said automatically copied search criteria and said additional search criteria.

4. The computer readable code according to claim 3, further comprising:

a subprocess for enabling said user to override one or more of said automatically copied search criteria; and a subprocess for retaining said overridden search criteria pertaining to said collection of search fields; and wherein said subprocess for performing said second search further comprises using said automatically copied search criteria, said additional search criteria, and said overridden search criteria.

5. The computer readable code according to claim 4, further comprising a subprocess for enabling said user to choose whether said overridden search criteria are treated as local overrides which apply only to particular ones of said search templates or as global overrides which apply to all search templates.

6. The computer readable code according to claim 1, further comprising a subprocess for enabling said user to clear said retained search criteria pertaining to said collection of search fields.

7. The computer readable code according to claim 2, further comprising a subprocess for prioritizing a given search criterion when said criterion has both (1) one of said default values or default patterns, and (2) one of a retained data value or a retained data pattern.

8. The computer readable code according to claim 1, wherein said selected search template was accessed last among said plurality of search templates by said user in a prior invocation of said computer readable code.

9. A system for providing a visually oriented, easily navigable search facility, said system comprising:

means for displaying a visual model for using said search facility;

a plurality of search templates, each of said search templates comprising a collection of one or more search fields;

means for enabling a user of said search facility to enter search criteria into said collection of search fields of a selected one of said search templates which is displayed using said visual model, wherein said entered search criteria comprise at least one of (1) one or more data values and (2) one or more data patterns;

means for retaining said entered search criteria pertaining to said collection of search fields;

means for performing a first search using said entered search criteria; and means for automatically copying one or more of said retained search criteria into selected fields of a second subsequently-displayed one of said search templates, wherein said selected search fields are those which are also present in said collection of search fields for which said search criteria were retained, even though said second search template may have a different collection of search fields than said selected search template and said selected search fields may be differently arranged on said second search template than on said selected search template, thereby pre-filling said second search template for performing a second search.

10. The system according to claim 9, wherein default criteria may exist for any of said one or more search fields, wherein said default criteria comprises at least one of (1) one or more default data values and (2) one or more default data patterns and further comprising:

means for displaying each of said default criterion in said one or more search fields for which it exists;

wherein said means for enabling said user to enter search criteria further comprises enabling said entered search criteria to replace one or more of said default criteria; and wherein said means for performing a first search further comprises using said default criteria that are not replaced along with said entered search criteria.

11. The system according to claim 9, further comprising:

means for enabling said user to enter additional search criteria into those search fields of said second search template which are not present in said collection of search fields for which said search criteria were retained; and means for performing said second search using said automatically copied search criteria and said additional search criteria.

12. The system according to claim 11, further comprising:

means for enabling said user to override one or more of said automatically copied search criteria; and means for retaining said overridden search criteria pertaining to said collection of search fields; and wherein said means for performing said second search further comprises using said automatically copied search criteria, said additional search criteria, and said overridden search criteria.

13. The system according to claim 12, further comprising means for enabling said user to choose whether said overridden search criteria are treated as local overrides which apply only to particular ones of said search templates or as global overrides which apply to all search templates.

14. The system according to claim 9, further comprising a subprocess for enabling said user to clear said retained search criteria pertaining to said collection of search fields.

15. The system according to claim 10, further comprising means for prioritizing a given search criterion when said criterion has both (1) one of said default values or default patterns, and (2) one of a retained data value or a retained data pattern.

16. The system according to claim 9, wherein said selected search template was accessed last among said plurality of search templates by said user in a prior invocation of said system.

17. A method of providing a visually oriented, easily navigable search facility, said method comprising the steps of:

displaying a visual model for using said search facility;

providing a plurality of search templates, each of said search templates comprising a collection of one or more search fields;

enabling a user of said search facility to enter search criteria into said collection of search fields of a selected one of said search templates which is displayed using said visual model, wherein said entered search criteria comprise at least one of (1) one or more data values and (2) one or more data patterns;

retaining said entered search criteria pertaining to said collection of search fields;

performing a first search using said entered search criteria; and automatically copying one or more of said retained search criteria into selected fields of a second subsequently-displayed one of said search templates, wherein said selected search fields are those which are also present in said collection of search fields for which said search criteria were retained, even though said second search template may have a different collection of search fields than said selected search template and said selected search fields may be differently arranged on said second search template than on said selected search template, thereby pre-filling said second search template for performing a second search.

18. The method according to claim 17, wherein default criteria may exist for any of said one or more search fields, wherein said default criteria comprises at least one of (1) one or more default data values and (2) one or more default data patterns and further comprising the step of:

displaying each of said default criterion in said one or more search fields for which it exists;

wherein said step of enabling said user to enter search criteria further comprises the step of enabling said entered search criteria to replace one or more of said default criteria; and wherein said step of performing a first search further comprises the step of using said default criteria that are not replaced along with said entered search criteria.

19. The method according to claim 17, further comprising the steps of:

enabling said user to enter additional search criteria into those search fields of said second search template which are not present in said collection of search fields for which said search criteria were retained; and performing said second search using said automatically copied search criteria and said additional search criteria.

20. The method according to claim 19, further comprising the steps of:
- enabling said user to override one or more of said automatically copied search criteria; and
- retaining said overridden search criteria pertaining to said collection of search fields; and
- wherein said step of performing said second search further comprises the step of using said automatically copied search criteria, said additional search criteria, and said overridden search criteria.

21. The method according to claim 20, further comprising the step of enabling said user to choose whether said overridden search criteria are treated as local overrides which apply only to particular ones of said search templates or as global overrides which apply to all search templates.

22. The method according to claim 17, further comprising a subprocess for enabling said user to clear said retained search criteria pertaining to said collection of search fields.

23. The method according to claim 18, further comprising the step of prioritizing a given search criterion when said criterion has both (1) one of said default values or default patterns, and (2) one of a retained data value or a retained data pattern.

24. The method according to claim 17, wherein said selected search template was accessed last among said plurality of search templates by said user in a prior invocation of said method.

* * * * *